United States Patent [19]

McDougall

[11] 3,844,276
[45] Oct. 29, 1974

[54] PROBE AND METHOD FOR DETECTING ESTRUS IN ANIMALS

[76] Inventor: John Edgar McDougall, 285 Briarhill Rd., Woodstock, Ontario, Canada N4S7T4

[22] Filed: July 19, 1973

[21] Appl. No.: 380,895

[52] U.S. Cl. ............. 128/2.1 E, 128/2 R, 128/2 H, 128/2.1 R, 128/2.1 Z, 324/62
[51] Int. Cl. ....................... A61b 5/04, A61b 10/00
[58] Field of Search............ 128/2.1 E, 2.1 Z, 2.1 R, 128/2 R, 2 H, DIG. 4, 407; 324/62, 71

[56] References Cited
UNITED STATES PATENTS

| | | | |
|---|---|---|---|
| 1,910,021 | 5/1933 | Legg | 128/2.1 R |
| 2,816,997 | 12/1957 | Conrad | 128/2 H |
| 3,313,293 | 4/1967 | Chesebrough et al. | 128/2.1 E |
| 3,403,684 | 10/1968 | Stiebel et al. | 128/407 |
| 3,605,722 | 9/1971 | Riseman et al. | 128/2.1 E |
| 3,635,213 | 1/1972 | LaHay | 128/2 R |
| 3,640,270 | 2/1972 | Hoffmann | 128/2.1 E |
| 3,704,705 | 12/1972 | Eckhart | 128/2 H |
| 3,749,089 | 7/1973 | Derr | 128/2.1 E |

Primary Examiner—Aldrich F. Medbery
Attorney, Agent, or Firm—Ridout & Maybee

[57] ABSTRACT

For detecting estrus in animals, particularly cattle and horses, a smooth cylindrical probe that fits snugly into the vagina is advanced into contact with the cervix, and is then withdrawn slightly so that a first electrode, at the inner end of the probe, is out of contact with animal tissue, and the resistance of mucus at the inner end of the probe is measured between said first electrode and another cylindrical electrode in contact with the vaginal wall.

10 Claims, 2 Drawing Figures

3,844,276
PATENTED OCT 29 1974
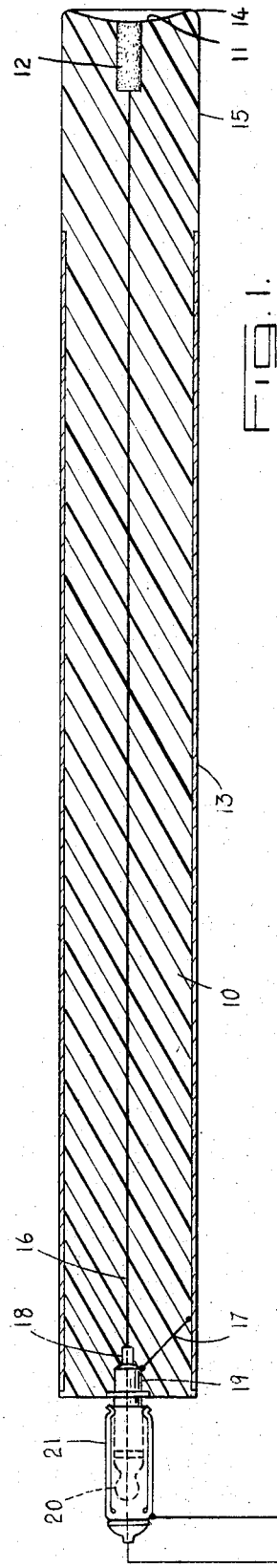
Fig. 1.
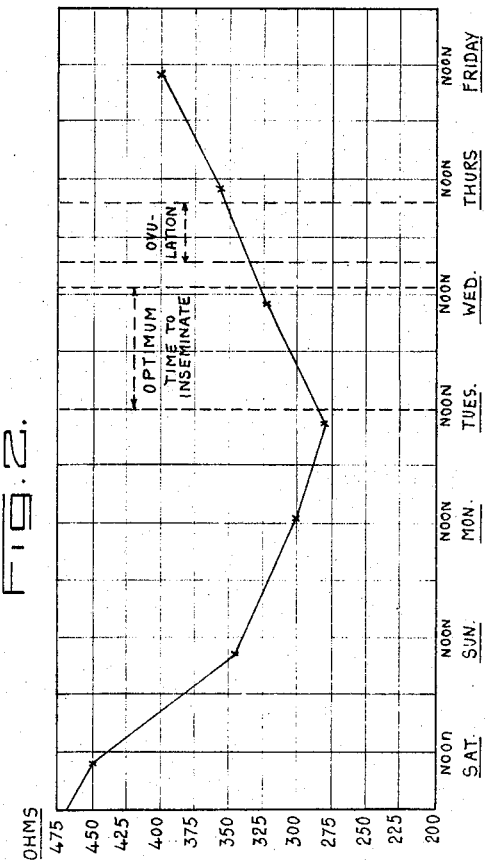
Fig. 2.
Probe Readings Through a Heat Cycle.
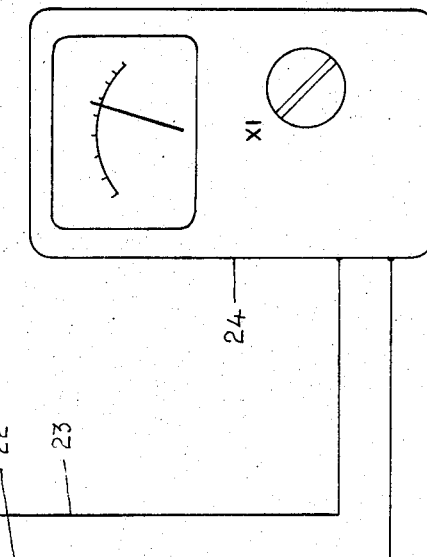

3,844,276

PROBE AND METHOD FOR DETECTING ESTRUS IN ANIMALS

BACKGROUND OF THE INVENTION

1. Field of the Invention

This invention relates to a probe for detecting estrus in animals, particularly in cattle and horses, and to a method of detecting estrus.

2. Description of the Prior Art

It has been disclosed by M. N. Stan, in Recueil de Medicine Veterinaire de L'ecole D'Alfort, volume 145, pages 369-373 (1969) that measurements of the electrical resistance of the mucous membrane of the vagina can give a good indication of estrus in cattle. As vaginal secretion increases the resistance decreases to a minimum, when insemination is effected.

SUMMARY OF THE INVENTION

In accordance with the present invention, a probe is provided which measures the electrical resistance of mucus with one electrode of the probe out of contact with animal tissue, the probe fitting snugly in the vagina and being of sufficient length and of a shape to collect and measure vaginal and cervical mucus.

BRIEF DESCRIPTION OF THE DRAWINGS

A preferred embodiment of the invention is illustrated in the accompanying drawings in which:

FIG. 1 is a longitudinal section of a probe, showing an ohmmeter connected thereto; and FIG. 2 is a chart showing typical daily readings taken with the apparatus of FIG. 1 to determine the optimum time for inseminating a cow.

DESCRIPTION OF THE PREFERRED EMBODIMENT

The probe illustrated in FIG. 1 consists of a cylindrical polyester rod 10 having a slightly concave distal end 11 in which is moulded a carbon electrode 12. Spaced from the end 11 is an elongated tubular bronze electrode 13. At the end 11 the peripheral rim 14 of the rod 10 is rounded, and the adjacent cylindrical surface 15 of the rod 10 is flush with the external surface of the electrode 13, so that the probe has smooth surfaces permitting it to be inserted into the vagina of an animal without injury to the tissue. The rod 10 constitutes an electrical insulator between the electrodes 12 and 13, 17 from these electrodes a pair of electrical conductors 16, 16 run to the other end of the rod where they are connected to terminals 18, 19. The terminals 18, 19 are coaxial elements of the male part 20 of a telephone jack, part 20 being partly embedded in the rod 10 which provides insulation between the conductors 16, 17. The female part 21 of the jack can be connected with the male part to connect the terminals 18, 19 through leads 22, 23 to an ohmmeter 24.

The probe can be manufactured by setting into a mold the electrodes 12, 13 as well as the male connector 20, which is connected by the conductors 16, 17 to the electrodes, and then pouring into the mold polyester resin mixed with a catalyst so that the resin sets within the mold, forming the rod 10. The molded probe is then removed from the mold and any rough surfaces are smoothed off.

The dimensions of the probe are related to the animal to be tested as follows. The diameter of the probe should be such as to fit snugly within and slide easily along the vagina of the animal, so that the electrode 13 is in contact with the vaginal tissue. For a cow or mare a suitable diameter is 1⅛ inches. The length of the probe should be sufficient to permit the probe to be inserted until the end 11 contacts the cervix. For a cow or mare a probe 11¼ inches long is satisfactory. As the probe is inserted, vaginal mucus is spread along the probe and both vaginal and cervical mucus are collected in the concave end 11 and are spread along the cylindrical rod surface 15, the length of this surface suitably being about 1¾ inches. The probe is inserted until it touches the cervix and then it is withdrawn slightly so that the electrode 12 is out of contact with tissue, the rim 14 around the concavity 11 helping to ensure that only mucus and not tissue is in contact with the electrode 12, which is spaced rearwardly of the rim 14. This ensures that, when a reading is taken with the ohmmeter to measure the resistance between the electrodes 12 and 13, a good indication is obtained of the electrically resistive condition of the mucus, particularly of the cervical mucus. It is a good plan when reading the ohmmeter to move the probe back and forth, without touching the cervix, but the reading of the ohmmeter does not fluctuate much during such movement. The electrode 13 extends over the major length of the probe to ensure good contact with the epithelial lining of the vagina, this lining of course usually having a mucous coating.

For cattle and horses an ohmmeter that measures resistances between about 200 and 500 ohms is satisfactory. Before using the probe and ohmmeter should be checked, preferably by connecting a known resistance across it and setting the ohmmeter to read correctly. The probe is carefully disinfected and cleaned, and the vulva of the animal is cleaned, and then the probe is inserted, obtaining a good covering of vaginal and cervical mucus on the end of the probe, and with the end of the probe near the cervix a reading of resistance is taken as previously described. Then the probe is removed and thoroughly disinfected and cleaned.

To determine the best time for inseminating the animal, daily measurements of resistance are taken, beginning with the day when the first signs of estrus occur or, in the case of a cow for example, on the 18th day of her 21 day cycle. Typical measurements for a cow are shown in FIG. 2. On the 18th day of the cycle (Saturday noon in FIG. 2) a resistance of 450 ohms was measured. By Tuesday the resistance had dropped to 280 ohms, and the best time to inseminate the cow is during approximately the 24 hour period following minimum resistance. Ovulation occurs shortly thereafter. The resistance measurements may of course be checked against the usual visual signs and rectal examinations to determine the development of follicles on the ovaries.

While a preferred embodiment of the invention has been described, changes may be made within the scope of the following claims. In particular, it will be apparent that different materials may be used, and that probes of smaller size than the one described will be used for very yound heifers and for swine.

What I claim as my invention is:

1. A probe for detecting estrus, comprising a smooth cylindrical rod insertable into the vagina of an animal and sufficiently conductors to touch the cervix with one end of the rod, said one end having a concavity bounded by a rim, a first electrode in said cavity and exposed at said one end providing a means that is in contact with cervical mucus but being located within the concavity and spaced rearwardly of the rim so as to be out of contact with tissue of the animal when the rod is slightly withdrawn to a position away from the cervix, a second elongated electrode along the outside surface of the rod spaced from said one end and held by the rod snugly against the vaginal wall and electrically insulated from the first electrode, and an electrical connection for each of said electrodes at the other end of the rod adapted to be connected to a resistance measuring means.

2. A probe as claimed in claim 1, wherein the length of the rod approximately equals the distance from the cervix to the vulva and the rod is of circular cross section and of a diameter that fits snugly in the vagina.

3. A probe as claimed in claim 2 for detecting estrus in cattle and horses, wherein the rod is approximately 11¼ inches long and approximately 1⅛ inches in diameter.

4. A probe as claimed in claim 3, wherein the second electrode comprises a tubular conductive sheath extending at least about 8 inches along the length of the rod.

5. A probe as claimed in claim 2, wherein the second electrode, except for being spaced from said one end, constitutes a tubular conductive sheath extending substantially the entire length of the rod.

6. A probe as claimed in claim 2, wherein the rod comprises a solid body of molded plastic in which said electrical connections are embedded.

7. A probe as claimed in claim 2 in combination with an ohmmeter connected to said connections.

8. A method of detecting estrus, comprising inserting into the vagina of an animal a smooth probe having one electrode in a cavity on its distal end and that fits snugly in the vagina, advancing the probe until its distal end touches the cervix, withdrawing the probe slightly away from the cervix to ensure that said probe electrode is out of contact with tissue of the animal but in contact with cervical mucus, and measuring the electrical resistance of mucus between said electrode and a second surface mounted probe electrode spaced from said one electrode.

9. A method as claimed in claim 8, wherein said measurement is made with said second electrode in contact with the vaginal wall.

10. A method as claimed in claim 9, wherein mucus is collected in said concavity of distal inner end as it is advanced along the vagina.

* * * * *